United States Patent [19]

Rudolph et al.

[11] 4,295,864
[45] Oct. 20, 1981

[54] PROCESS OF TREATING PRESSURIZED CONDENSATE

[75] Inventors: Paul Rudolph, Bad Homburg; Paul D. Becker, Eschborn, both of Fed. Rep. of Germany

[73] Assignee: Metallgesellschaft Aktiengesellschaft, Frankfurt, Fed. Rep. of Germany

[21] Appl. No.: 99,179

[22] Filed: Nov. 30, 1979

[30] Foreign Application Priority Data

Dec. 14, 1978 [DE] Fed. Rep. of Germany ....... 2853989

[51] Int. Cl.³ .................... B01D 53/14; B01D 19/00
[52] U.S. Cl. ........................... 55/40; 55/48; 55/50; 55/89
[58] Field of Search ............... 55/40, 41, 42, 48, 49, 55/50, 89, 58

[56] References Cited

U.S. PATENT DOCUMENTS

| | | | |
|---|---|---|---|
| 2,793,938 | 5/1957 | Frank | 55/89 X |
| 2,817,411 | 12/1957 | Coberly | 55/89 X |
| 2,894,601 | 7/1959 | Schmidt et al. | 55/48 X |
| 3,266,220 | 8/1966 | Woertz | 55/48 |
| 3,320,906 | 5/1967 | Domahidy | 55/89 X |
| 3,435,590 | 4/1969 | Smith | 55/48 X |
| 3,581,472 | 6/1971 | Grosick | 55/48 |
| 3,785,120 | 1/1974 | Merriman et al. | 55/48 X |
| 3,824,766 | 7/1974 | Valentine et al. | 55/48 |
| 4,149,859 | 4/1979 | Vigesdal | 55/89 |

*Primary Examiner*—Robert H. Spitzer
*Attorney, Agent, or Firm*—Sprung, Felfe, Horn, Lynch & Kramer

[57] ABSTRACT

A process of treating aqueous condensate which is formed as a result of the cooling of raw gas produced by the gasification of solid fuels under a pressure of 5 to 150 bars. The condensate formed as a result of the cooling is at a temperature of at least 110° C. and under a pressure of at least 2 bars and at least part of it is pressure-relieved. The flashed-off vapor is removed and the pressure-relieved condensate is fed to a separator, from which a condensate phase consisting mainly of water is withdrawn. The condensate or a portion thereof is used as a coolant for the raw gas. The flashed-off vapor may be burnt.

5 Claims, 2 Drawing Figures

PROCESS OF TREATING PRESSURIZED CONDENSATE

BACKGROUND OF THE INVENTION

1. Field of the Invention

This invention relates to a process of treating aqueous condensate which has been formed as a result of the cooling of raw gas produced by a gasification of solid fuels by a treatment with gasifying agents which contain oxygen, water vapor and/or carbon dioxide under a pressure of 5 to 150 bars, which raw gas is cooled in at least one cooling stage.

2. DISCUSSION OF THE PRIOR ART

Such process has been described in German Offenlegungsschrift No. 2,543,532 and corresponding U.S. Pat. No. 4,065,273. It is also known to gasify solid fuels, particularly coal or lignite, with oxygen, steam or carbon dioxide as a gasifying agent, under a pressure of 10 to 150 bars. Suitable processes, in which the fuel is kept in a fixed bed and the incombustible mineral constituents of the fuel are withdrawn under the fixed bed as solid ash, are described, e.g., in Ullmanns Enzyklopadie der technischen Chemie, 4th edition (1977), volume 14, pages 383 to 386. Details of that known gasification process are apparent from U.S. Pat. No. 3,540,867 and U.S. Pat. No. 3,854,895. It is also known to gasify the fuel in a fixed bed in conjunction with a removal of liquid slag. This is disclosed in British Patent Specifications Nos. 1,507,905; 1,506,671; and 1,512,677.

The raw gas produced by the known process of gasifying in a fixed bed usually becomes available at temperatures between 300° and 900° C. and contains substantial quantities of water vapor and also products of dry distillation, such as tar, phenols, fatty acids, and ammonia. These accompanying substances are contained in the condensate which is formed as the raw gas is cooled, and they must be removed in various process stages. To that end, tar and oil are removed from the condensate, which is then subjected to an extraction of phenol, a removal of ammonia and finally to biological processing.

It is also known to gasify pulverized coal. In that case, no fixed bed is employed and the resulting raw gas is free from tar and oil and becomes available at temperatures up to about 1400° C. Aqueous condensate is also formed as that raw gas is cooled.

SUMMARY OF THE INVENTION

It is an object of the invention to cool the raw gas in a simple and economical manner. In accordance with the process of this invention, this is accomplished in that at least part of the condensate which has formed as a result of the cooling and is at a temperature of at least 110° C. and a pressure of at least 2 bars is pressure-relieved, the flashed-off vapor is removed, the pressure-relieved condensate is fed to a separator, and a condensate phase consisting mainly of water is withdrawn from the separator and used as a cooling fluid for the raw gas. The cooling of the raw gas and the resulting production of condensate may be effected by direct and/or indirect cooling. Generally, the raw gas condensate is pressure-relieved to finally about atmospheric pressure, which is the usual pressure in the separator.

The condensate is cooled as it is pressure-relieved. If the condensate is pressure-relieved to atmospheric pressure, vapor will be flashed-off at a volume D, which can be calculated from the water volume W before the pressure relief and the enthalpy I of the water before the pressure relief as follows:

$$D = W \cdot (I - 100)/(639.1 - 100).$$

The raw gas is suitably passed through a plurality of cooling stages and in at least one of the cooling stages is subjected to indirect cooling, in which no recycled condensate is used. The rate at which heat is dissipated by said indirect cooling may be controlled to adjust the rate at which vapor is flashed-off. The latter rate may be adjusted so that the rate at which vapor is flashed-off and removed is balanced with the rate at which new condensate is formed.

According to a preferred feature of the process, the flashed-off vapor is burnt. Phenols, fatty acids and ammonia are contained particularly in the flashed-off vapor which has been derived from raw gas produced by the gasification in a fixed bed, and together with the water vapor can be removed and eliminated by being burnt. In this way the treatment of the remaining condensate will be greatly simplified. The combustion temperatures will gradually exceed 800° C. The flue gases produced by the combustion consist substantially only of $H_2O$, $CO_2$, and $N_2$ and are not polluting. The $SO_2$ content of the flue gas lies generally below the permissible limits. Sensible heat of the flue gases can be used to generate steam before they are discharged into the atmosphere.

In a desirable embodiment, the condensates which have become available in a plurality of cooling stages are separately pressure-relieved, pressure-relieved condensates are fed to separate separators, the flashed-off vapor streams are combined and jointly burnt, and the condensate phases consisting mainly of water are jointly used as coolant in at least one of the cooling stages in which the raw gas is cooled indirectly. In that case, the condensate to be re-used as coolant need not be pressurized to the pressure in the gasifier because said condensate does not contact the raw gas.

The condensate may be pressure-relieved in a plurality of stages. Before the flashed-off vapor is burnt, it may be passed through at least one gas turbine for a recovery of energy.

BRIEF DESCRIPTION OF DRAWINGS

Examples of process systems will be explained with reference to the accompanying flow diagrams, in which.

DESCRIPTION OF SPECIFIC EMBODIMENTS

Figure 1:
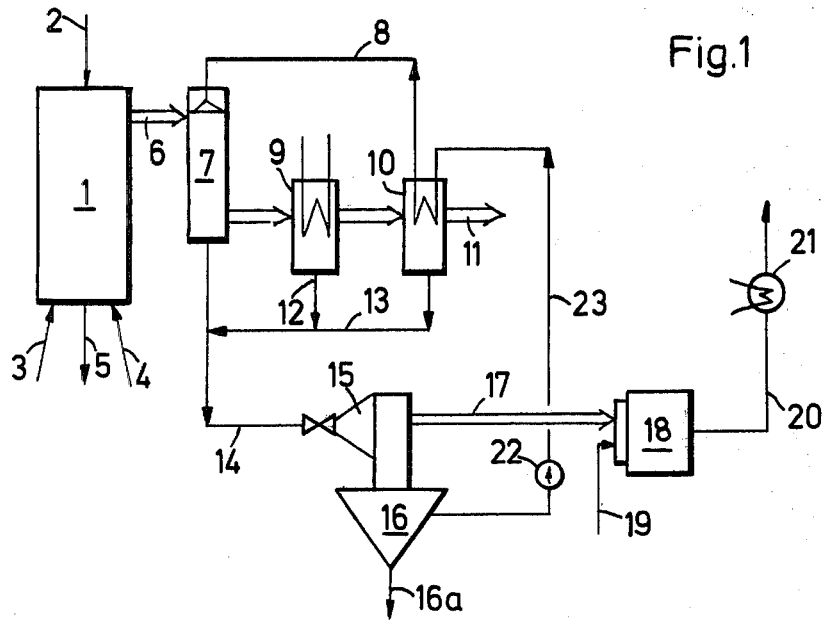
FIG. 1 shows a first embodiment of the process of the invention.

In the process which is diagrammatically shown in FIG. 1, granular coal having a particle size of about 3 to 60 mm is fed to a gasifying reactor 1 via duct 2. Gasifying agents consisting of oxygen and steam are fed to the reactor via ducts 3 and 4. The incombustible constituents are withdrawn via duct 5. In the gasifying reactor there is a pressure of 5 to 150 bars, and the fuel therein preferably constitutes a fixed bed. Raw gas is withdrawn from the reactor via duct 6 and is sprayed in a scrubber-cooler 7 with condensate from conduit 8 so that the raw gas is saturated with water vapor and cooled to temperatures of about 150° to 220° C. The raw gas then flows through two additional cooling stages, which consist of heat exchangers 9 and 10, and is indirectly cooled therein. Raw gas which is still at temperatures of about 110° to 130° C. and consists mainly of hydrogen, carbon oxides and methane is fed in duct 11 to means, not shown, for its further processing.

The condensates which become available in the cooling stages are collected in conduits 12 and 13 and together with the condensate from the scrubber-cooler 7 are fed in conduit 14 to a pressure-relieving unit 15. The condensate which has been cooled and pressure-relieved to atmospheric pressure is fed to a tar separator 16, in which the liquids are separated by gravity.

A heavy phase which contains dust and tar is withdrawn at 16a from the lower end of the tar separator. All or a major part of it may be recycled to the reactor 1. The flashed-off steam is fed via duct 17 to a combustion chamber 18, which is fed with additional fuel via duct 19. The flue gases are withdrawn via duct 20 and sensible heat of the flue gases is utilized in a steam generator 21.

A condensate phase which consists mainly of water and has a low tar content and is virtually free from solids is fed from the tar separator 16 in a conduit 23 by means of a pump 22 to the heat exchanger 10, from which the condensate then flows in conduit 8 to the scrubber-cooler 7. The condensate which flows along that path must be pressurized by the pump 22 at least to the pressure in the gasifying reactor 1 because the same pressure prevails in the scrubber-cooler 7.

Figure 2:
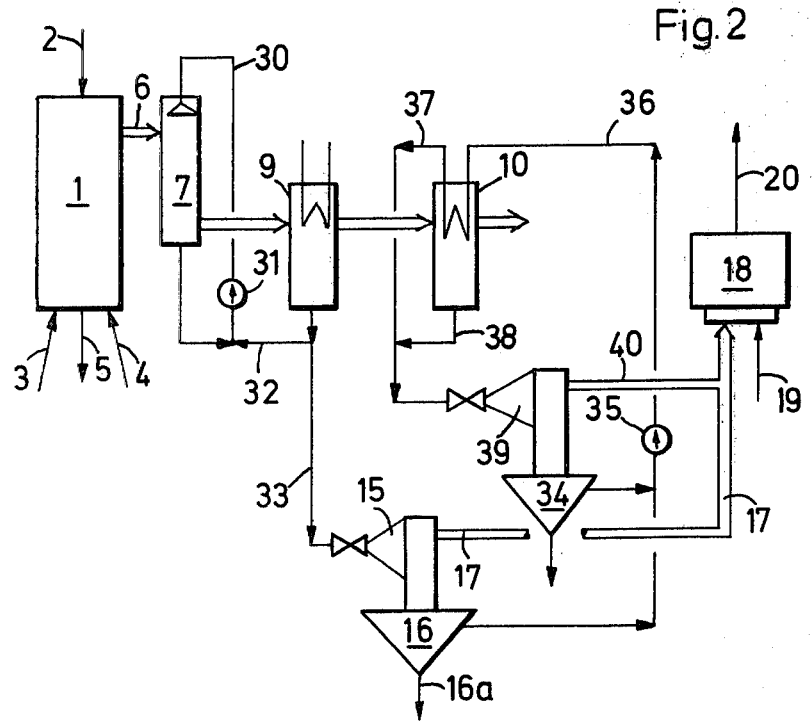
FIG. 2 shows a second embodiment of the process of the invention.

In the modified process system shown in FIG. 2, the condensate which is withdrawn from the tar separator and is to be re-used for cooling may be pressurized to a pressure which is lower than that in the scrubber-cooler 7. Where the diagram of FIG. 2 agrees with that of FIG. 1, the same reference characters have been used and the explanations given with reference to FIG. 1 are also applicable.

In the scrubber-cooler 7 of FIG. 2, the condensate is circulated via conduit 30 and pump 31. Part of the condensate which becomes available in the heat exchanger 9 is fed via conduit 32 to that cycle. The remaining condensate is fed via conduit 33 to the pressure-relieving unit 15. Cooled condensate is collected in the tar separator. Flashed-off steam is withdrawn in duct 17. The heavy phase leaves the tar separator 16 through conduit 16a.

The light phase withdrawn from the tar separator 16 consists mainly of water and together with the corresponding phase of another tar separator 34 is re-used as coolant. For that purpose the mixed phases are fed in conduit 36 to the heat exchanger 10 by means of a pump 35. Heated coolant flowing in conduit 37 is combined with new condensate from conduit 38 and the mixed fluids are fed to a pressure relief unit 39. Pressure-relieved condensate flows into the tar separator 34, and the flashed-off vapor flows in duct 40 to the combustion chamber 18 together with flashed-off steam from duct 17. If the pressure of the liquid coolant in conduit 36 is lower than the pressure of the raw gas in the heat exchanger 10, the condensate in conduit 38 must be conducted via a pressure relief valve, which has been omitted in the drawing for the sake of clearness.

EXAMPLE 1

In a process system as shown in FIG. 1, coal having a particle size of 3 to 60 mm was gasified in a fixed bed. Coal in an amount of 1000 kg (on a water- and ashfree basis), which still contained 94 kg moisture and 107 kg ash, was treated with gasifying agents consisting of 295 standard m³ of oxygen and 1350 kg of steam. The pressure in the gasifying reactor 1 was about 30 bars. The raw gas stream in duct 6 had a temperature of 428° C. and a total volume of 2108 standard m³ (on a dry basis). The raw gas had the following composition in % by volume:

| | |
|---|---|
| $CO_2$ | 31.7 |
| $H_2S$ | 0.5 |
| $C_nH_m$ | 1.1 |
| CO | 17.2 |
| $H_2$ | 37.7 |
| $CH_4$ | 10.2 |
| $N_2$ | 1.6 |

The raw gas stream also contained 69 kg tar, oil and naphta and about 8 kg phenols, 1.3 kg fatty acids, 11 kg ammonia and 1547 kg water vapor.

The raw gas stream was fed to the scrubber-cooler 7 and was intensely sprayed therein with water from conduit 8. The gas leaving the scrubber-cooler was at a temperature of 186° C. and saturated with water vapor. Part of the sensible heat of the gas was used in the heat exchanger 9 to generate steam. The gas leaving the heat exchanger 9 had a temperature of 164° C. and then entered the tubular heat exchanger 10, which was flown through by water, which circulated in conduits 23 and 8. Gas at a temperature of 120° C. was withdrawn from the process in duct 11.

8000 kg circulated water at a pressure of 31 bars and a temperature of 100° C. were discharged by the pump 22 and after flowing through the heat exchanger 10 had in conduit 8 a temperature of 141° C. That water was used in the scrubber-cooler 7 to scrub the raw gas and to cool it to 186° C. at the same time. 9421 kg of mixed condensates at a temperature of 182° C. flowed through conduit 14. That mixture contained tar, dust, phenols, fatty acids and ammonia in addition to $H_2O$ and was pressure-relieved to 1 bar, whereby 1420 kg water vapor were flashed-off as well as phenols, fatty acid and ammonia vapors. The mixed vapors were fed in duct 17 to the combustion chamber 8, which was also supplied with fuel and air and in which the mixed vapors were burnt at a combustion temperature of at least 850° C. The flue gases were passed through a conventional boiler 21 to generate steam.

Tar and dust were separated from the pressure-relieved condensate in the gravity-type tar separator. The aqueous condensate was then available for recirculation in conduit 23.

EXAMPLE 2

The gasification of coal described in Example 1 was repeated. In other respects, a process system as shown in FIG. 2 was employed. Just as in Example 1, the raw gas flowed through the scrubber-cooler 7 and the two heat exchangers 9 and 10. The scrubber-cooler 7 was now fed with water which was circulated by the scrubber-cooler pump 31. Most of the condensate which became available in the heat exchanger 9 was fed to the pressure-relief vessel 15 mounted on top of the tar separator 16. In the vessel 15, 957 kg condensate were pressure-relieved at 170° C. The flashed-off vapor comprised 123 kg water vapor as well as phenols, ammonia and fatty acid vapors. Tar and dust were removed from the tar separator in conduit 16a.

The heat exchanger 10 was cooled by circulated water. 834 kg water at 100° C. became available from the tar separator 16 as well as 12,702 kg water from the tar separator 34. The circulating pump 35 discharged 13,536 kg water at a pressure of about 5 bars. That water was heated in the heat exchanger 10. After a supply of 464 kg condensate from conduit 38, a total amount of 14,000 kg water at 150° C. were pressure-relieved to 1 bar before entering the tar separator 34. As a result, 1298 kg $H_2O$ vapor were flashed-off. The flashed-off vapors were jointly fed to the combustion chamber 18 via ducts 40 and 17.

What is claimed is:

1. In a process of treating aqueous condensate which has been formed as a result of the cooling of raw gas produced by a gasification of a solid fuel by treatment with a gasifying agent which contains oxygen, water vapor and/or carbon dioxide under a pressure of 5 to 150 bars, which raw gas is cooled in at least one cooling stage, the improvement wherein at least part of said condensate which has formed as a result of the cooling and is at a temperature of at least 110° C. and a pressure of at least 2 bars is pressure-relieved, the flashed-off vapor is removed and said flashed-off vapor is burned in a combustion chamber at a temperature exceeding 800° C. and phenols, fatty acids and/or ammonia are removed from said flashed-off vapor by said burning, the pressure-relieved condensate is fed to a separator, and a condensate phase consisting mainly of water is withdrawn from the separator and used as a cooling fluid for the raw gas.

2. A process according to claim 1 wherein the raw gas is passed through a plurality of cooling stages at least one of which comprises an indirect cooling without use of recycled condensate.

3. A process according to claim 1 wherein the condensates which have become available in a plurality of cooling stages are separately pressure-relieved, condensates are fed to separators, vapor streams are flashed-off from said separators, combined and jointly burnt, and the condensate phases consisting mainly of water are jointly used as coolant in at least one stage in which the raw gas is cooled indirectly.

4. A process according to claim 1 wherein the condensate is pressure-relieved in a plurality of stages.

5. A process according to claim 1 wherein the flashed-off vapor is passed through at least one gas turbine before it is burnt.

* * * * *